United States Patent [19]
Greenwald

[11] 4,441,723
[45] Apr. 10, 1984

[54] DUCT SEAL

[75] Inventor: Fred A. Greenwald, Battle Ground, Wash.

[73] Assignee: General Connectors Corp., Burbank, Calif.

[21] Appl. No.: 367,930

[22] Filed: Apr. 13, 1982

Related U.S. Application Data

[60] Division of Ser. No. 212,028, Dec. 2, 1980, abandoned, which is a continuation-in-part of Ser. No. 181,411, Aug. 26, 1980, abandoned.

[51] Int. Cl.³ .............................................. F16J 15/32
[52] U.S. Cl. .................................... 277/164; 277/163
[58] Field of Search ............... 277/229, 163, 164, 165, 277/235 A, 257

[56] References Cited

U.S. PATENT DOCUMENTS

| | | | |
|---|---|---|---|
| 2,535,634 | 12/1950 | Hubbard | 277/229 |
| 2,597,976 | 5/1952 | Cousins | 277/229 |
| 2,957,717 | 10/1960 | Bram | 277/163 |
| 3,031,213 | 4/1962 | Bruning et al. | 277/157 |
| 3,406,979 | 10/1968 | Weber | 277/164 |
| 3,464,707 | 9/1969 | Packard et al. | 277/164 |
| 3,603,602 | 9/1971 | Padula | 277/164 |
| 3,687,464 | 8/1972 | Jackson et al. | 277/153 |
| 3,698,727 | 10/1972 | Greenwald | 277/153 |
| 3,797,836 | 5/1974 | Halling | . |
| 3,813,105 | 5/1974 | McQueen | 277/164 |
| 3,918,726 | 11/1975 | Kramer | 277/165 |
| 4,141,563 | 2/1979 | Wu | 277/164 |

*Primary Examiner*—Robert I. Smith
*Attorney, Agent, or Firm*—Julius L. Rubinstein

[57] ABSTRACT

A rubber ring-shaped seal is provided with a centrally disposed ring-shaped elastomeric tubular insert mounted therein. A helical coil spring is mounted in the insert so that part of the ring-shaped insert is between the helical coil spring and the work-contacting surfaces of the seal. The seal is mounted on formations formed on a tubular housing which serves as a connector. These formations define seal-receiving channels which position the seal rings in the housing.

2 Claims, 13 Drawing Figures

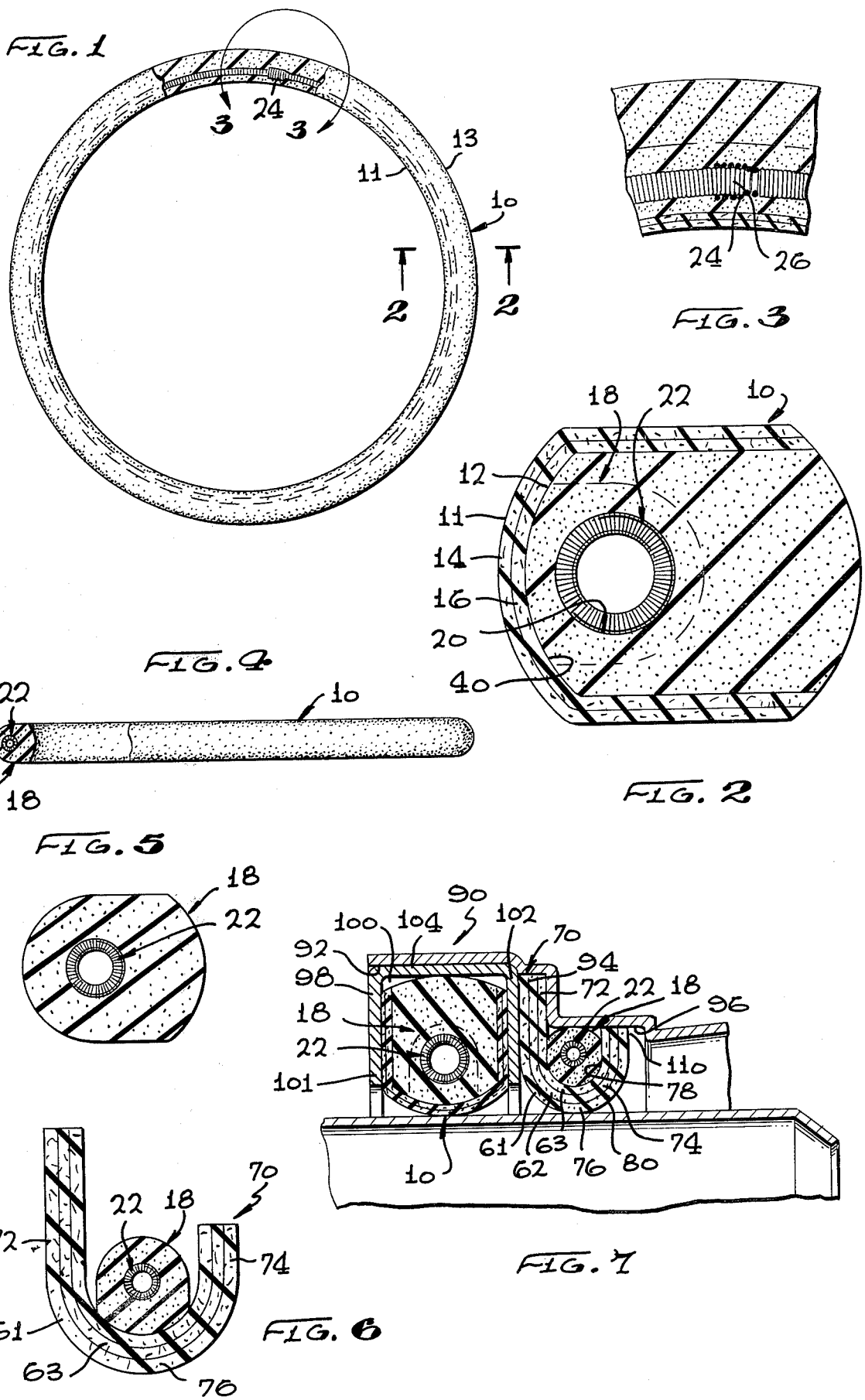

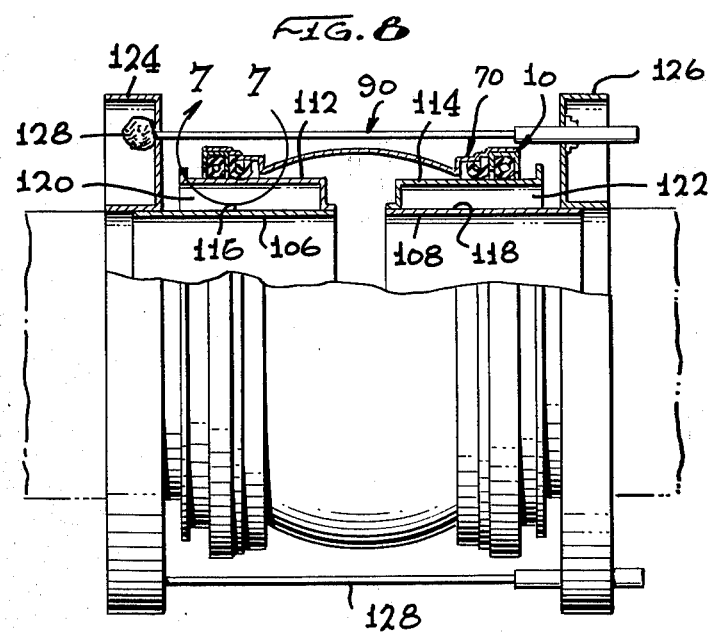
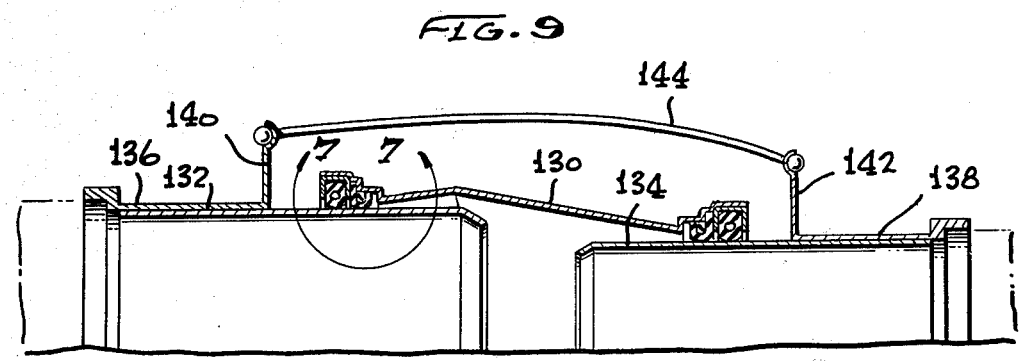
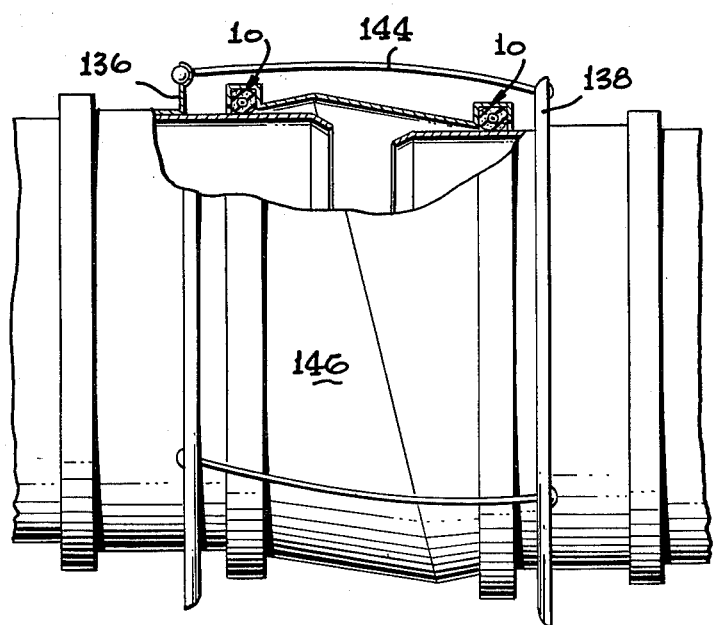

DUCT SEAL

This is a division of application Ser. No. 212,028, filed Dec. 2, 1980 which was a continuation-in-part of patent application Ser. No. 181,411, filed Aug. 26, 1980, both of which are now abandoned.

This invention relates to a seal, and more particularly to a ring-shaped seal with a centrally disposed garter spring mounted therein.

Rubber seals, particularly those used in aircraft connectors and ducts, tend to leak when cold due to variations between the thermal coefficients of the material composing the seal and the metal ducts. This leakage tends to increase after a period of use, particularly when the seal is used at elevated temperatures because the rubber forming the seal "sets" and becomes less resilient.

One way to prevent this leakage is to provide the seal with a garter spring under tension which embraces the seal. With this arrangement, when the seal is on a duct or connector, the spring exerts a compressive or radially inwardly directed force on the seal, causing the seal to make a sealing engagement with the duct or connector at low temperatures, and even after the rubber in the seal has "set."

Elastomeric seal which have a spring under tension inside are typically formed from a silicon impregnated rubber with one or more laminations of silicon impregnated fiberglass cloth molded to and covering surface at least the surface of the seal which makes a sealing engagement with a surface on a connector or duct. The cloth covering is used because it is resistant to abrasion so that the life of the seal is prolonged. This is shown in the patent to Kramer, U.S. Pat. No. 3,918,726, and Greenwald, U.S. Pat. No. 3,698,727.

Heretofore, however, the seals were made so the garter springs inside the seal abutted the inner surface of the fiberglass cloth, see the patent to Greenwald, U.S. Pat. No. 3,698,727. As a consequence, when the seals were used in aircraft, vibration caused the springs to rub against the inner surface of the fiberglass cloth, wearing it through in a comparatively short time. This destroyed the surface that makes a sealing engagement with the work so that the seal had to be replaced.

Since seals in aircraft are positioned at various locations along the ducts in the aircraft, they are often mounted in locations which are hard to get at, and which require the disassembly of many aircraft parts to reach when the seals have to be replaced. This increases down time for the aircraft which greatly increases the cost of aircraft operation.

It is apparent that if the useful life of the seals could be increased, a disproportionately large savings in the cost of aircraft operation would result.

One way to increase the useful life of such seals is to prevent the springs mounted inside the seal from rubbing against the inner surface of the fiberglass cloth. If the spring, although under tension, could be held away from the inner surface of the cloth, then there would be a thickness of rubber between the spring and the inner surface of the fiberglass cloth. This would greatly prolong the useful life of the seal because before the spring could rub against and through the fiberglass cloth it would first have to rub through this thickness of rubber.

Heretofore, as exemplified by the patent to Weber, U.S. Pat. No. 3,406,979, efforts were made to solve the problem of centering a spring inside a seal. The Weber approach had a number of disadvantages. First of all, it required expensive hydraulic equipment. Secondly, it was time consuming because it required two separate molding steps, and it required the seal half sections to be preformed. Thirdly, "flash" formed on the work-engaging surfaces of the Weber seal. "Flash" is that part of the elastomeric material which forms at the junction of the mold, and in this instance it appears as irregular clumps of rubber. This "flash" had to be removed in order to form the sealing surface in the Weber seal, but it was time consuming and costly to do this. In addition, the work-engaging surfaces of the Weber seal was not composed of silicon impregnated fiberglass cloth so it did not have a sufficiently long, useful life.

What is needed, therefore, and comprises an important object of this invention is to provide a connector with a seal where the seal is formed from an elastomeric material with fiberglass cloth covering at least the work-engaging surface of the seal and where the seal has a spring under tension mounted inside the seal which is held in radially spaced relationship away from the inner surface of the fiberglass cloth.

This and other objects of this invention will become more apparent when better understood in light of the accompanying drawings and specifications wherein:

FIG. 1 is a plan view of a seal constructed according to the principals of this invention.

FIG. 2 is a sectional view taken on line 2—2 of FIG. 1.

FIG. 3 is an enlarged view of the region surrounded by the circular arrow 3—3 in FIG. 1.

FIG. 4 is an elevational view of the ring-shaped tubular insert with the coil spring inserted therein.

FIG. 5 is a cross-sectional view of the tubular insert with the coil spring in the tubular bore.

FIG. 6 discloses a ring-shaped seal, J-shaped in cross-section, with an elastomeric insert constructed according to the principles of this invention.

FIG. 7 discloses an enlarged portion of a double-sealed connector such as those shown in FIGS. 8 and 9, wherein the inner ring-shaped seal is constructed like the seal shown in FIG. 6, and the outer seal is constructed like the seal shown in FIG. 2.

FIG. 8 discloses an aligned double-seal restrained connector utilizing the double-seal structure shown in FIG. 7.

FIG. 9 discloses an offset double-seal connector utilizing the double-seal structure shown in FIG. 7.

FIG. 10 discloses an offset single-seal restrained connector with the seal shown in FIG. 2.

Figure 11:
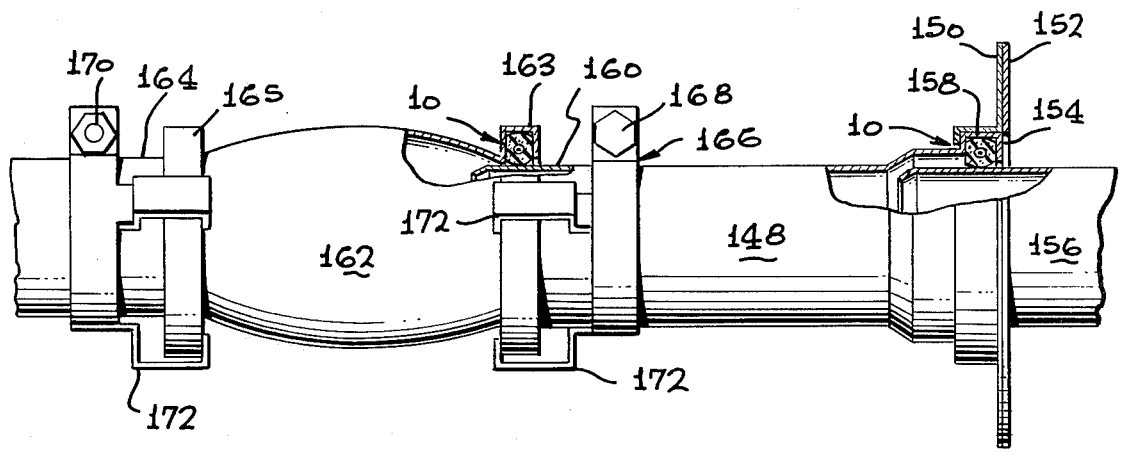

FIG. 11 discloses a conduit arrangement employing a single-seal bulkhead connector in combination with a restrained connector and the seal shown in FIG. 2.

Figure 12:
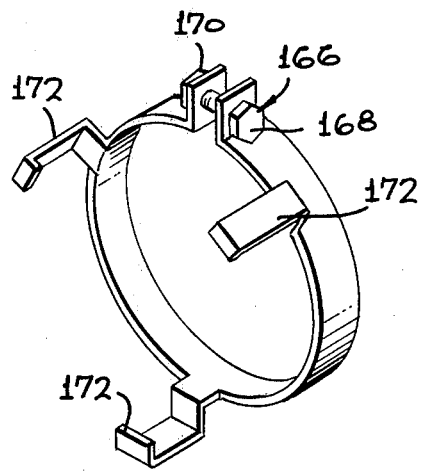

FIG. 12 is a perspective view of a connector clamp used in combination with the restrained connector of FIG. 11.

Figure 13:
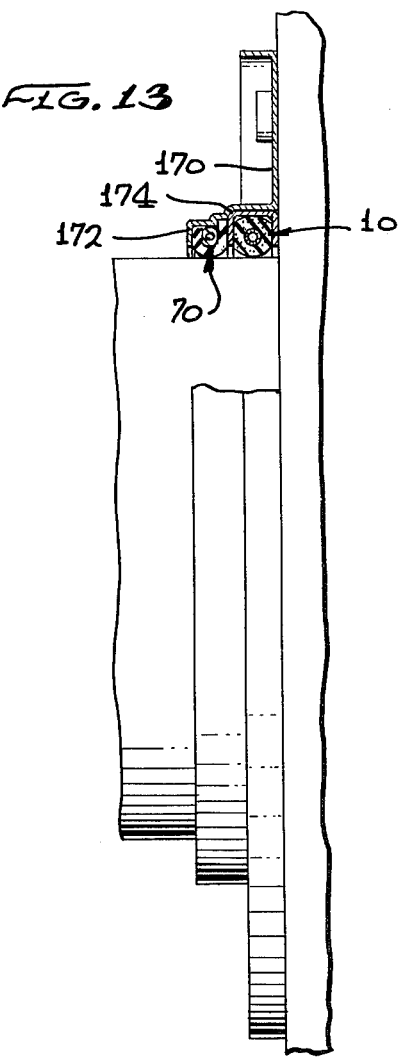

FIG. 13 discloses a double-seal bulkhead connector wherein the inner seal is shown in FIG. 6 and the outer seal is shown in FIG. 2.

Referring now to FIG. 1 of the drawings, a ring-shaped O-ring type seal indicated generally by the reference numeral 10 is formed from an elastomeric material such as silicone impregnated rubber. Referring to FIG. 2, the seal 10 has a surface 12 which is covered by two layers of laminations of silicon impregnated fiberglass cloth 14 and 16 to form a continuous work engaging surface which is shaped to make a sealing engagement with a surface on a connector or duct. A ring shaped